May 31, 1932.  H. E. ZINK  1,860,520
AUTOMOBILE UPHOLSTERY COVER SET
Filed Oct. 31, 1929   3 Sheets-Sheet 2
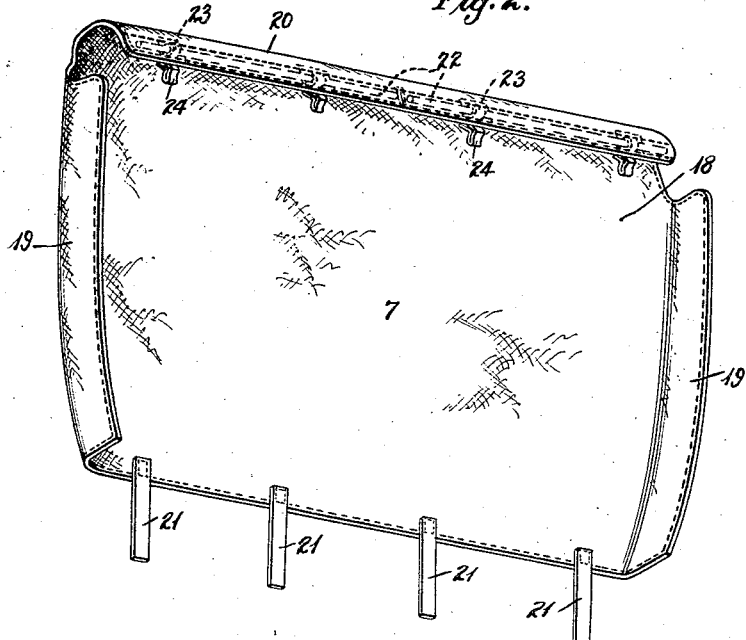
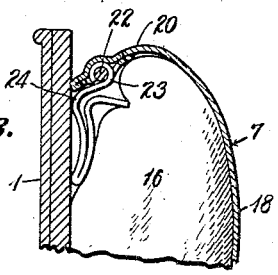
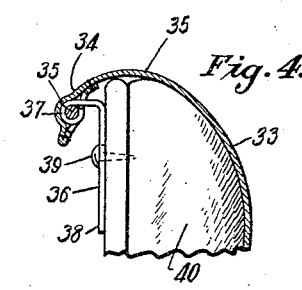
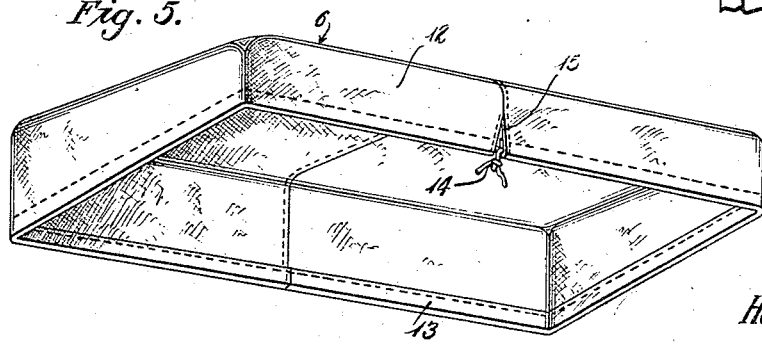
Inventor
Howard E. Zink
By Linton, Kellogg & Smith
Attorneys May 31, 1932.  H. E. ZINK  1,860,520
AUTOMOBILE UPHOLSTERY COVER SET
Filed Oct. 31, 1929   3 Sheets-Sheet 1
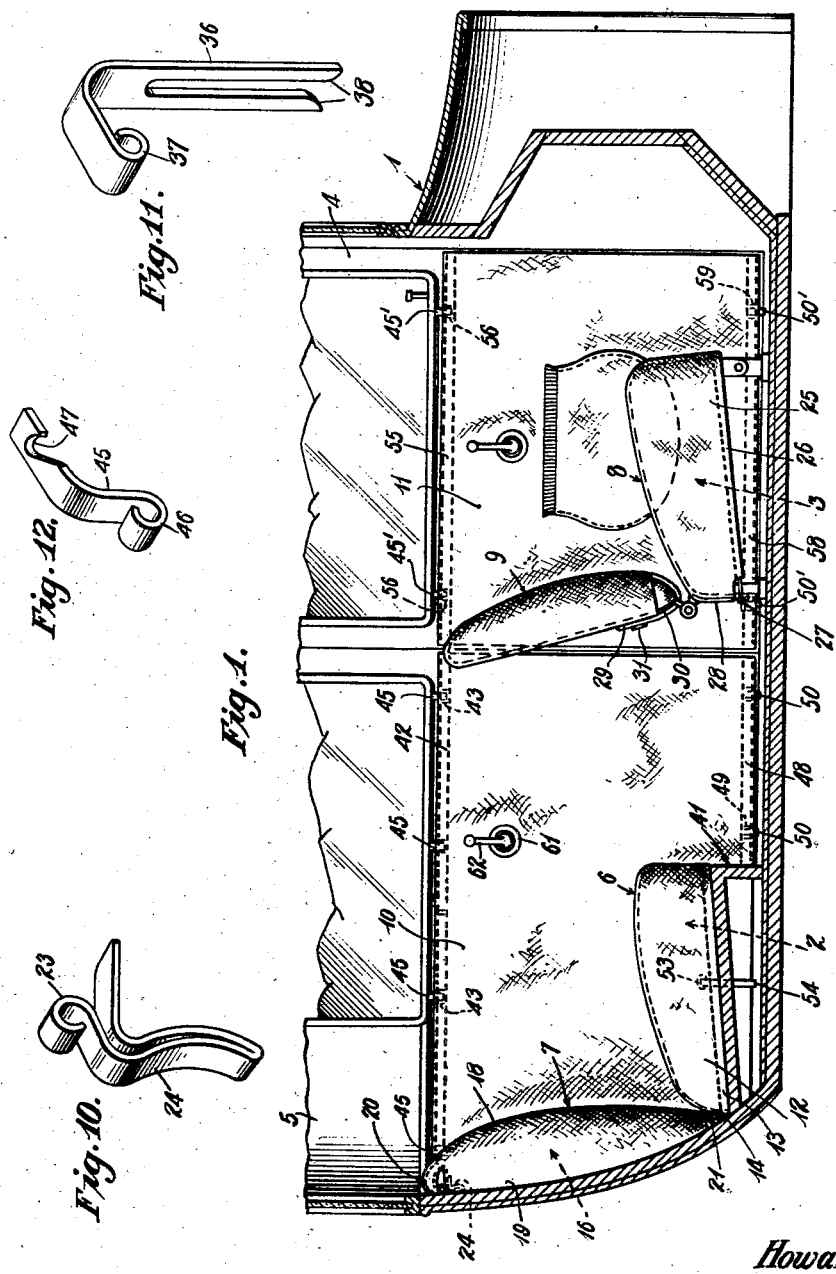
Inventor
Howard E. Zink
By Linton, Kellogg Smith
Attorneys May 31, 1932. H. E. ZINK 1,860,520
AUTOMOBILE UPHOLSTERY COVER SET
Filed Oct. 31, 1929 3 Sheets-Sheet 3
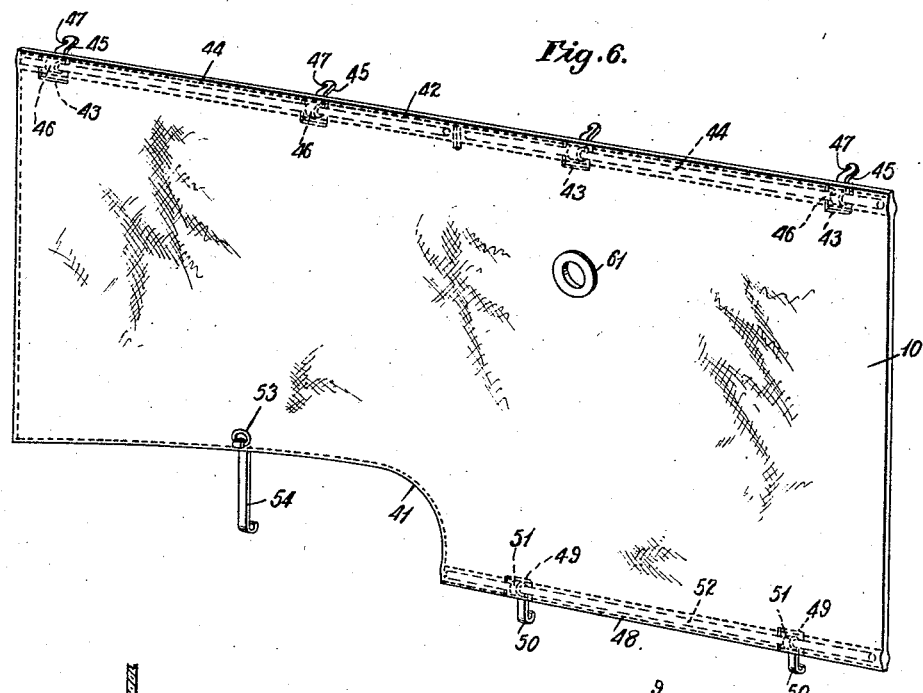
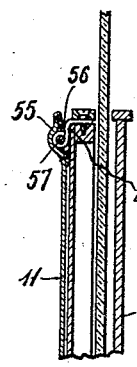
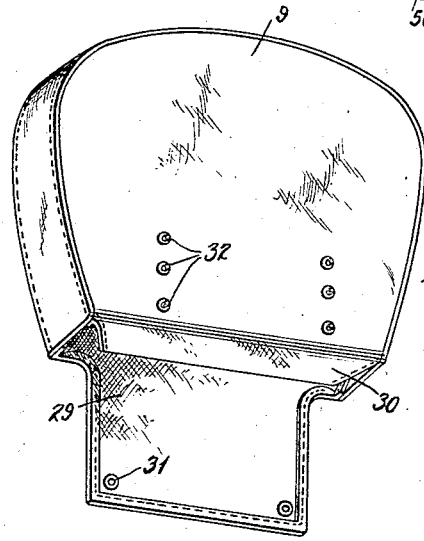
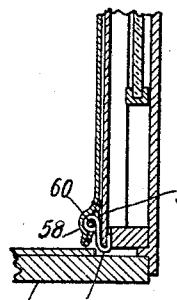
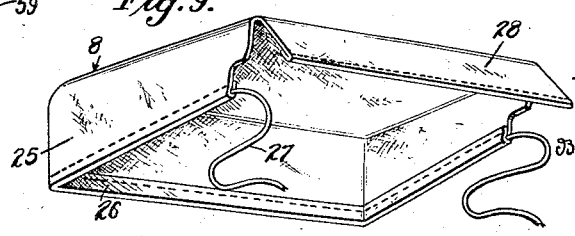
Inventor
Howard E. Zink Patented May 31, 1932

1,860,520

UNITED STATES PATENT OFFICE

HOWARD E. ZINK, OF FREMONT, OHIO

AUTOMOBILE UPHOLSTERY COVER SET

Application filed October 31, 1929. Serial No. 403,851.

This invention relates to improvements in upholstery covers for use over those upholstered portions of an automobile body interior which are subject to contact with and wear from occupants of the same, the covers being adapted to shield the original upholstery and hence, to prolong the period of usage thereof.

It is also an object of the invention to provide covers of the identified character, which are so constructed and designed as to permit of neat and smooth fitting of the same over the seats, back rests and body side walls without liability of disengagement or disarrangement and yet, when it is desired, to permit of their quick and convenient removal for laundering and replacement.

It is furthermore an object of the invention to provide portions of the upholstery covers with devices for permitting the even attachment or hanging of the same adjacent to the automobile body side walls in a substantially taut and unwrinkled condition, said devices being positively and readily engageable with portions of the body walls without liability of damaging the same or the upholstery thereover and without need of alteration in any manner.

It is also amongst the principal desiderata of the invention to provide the back rest covers of the set with means for effecting an even and uniform connection thereof with the seat back rests, ensuring a neat and smooth fitting throughout their area and also, allowing of quick and convenient removal or disengagement from said rests, as conditions may require.

Other objects of the invention will be in part obvious and in part pointed out hereinafter.

In order that the invention and its mode of operation may be readily understood by persons skilled in the art, I have in the accompanying illustrative drawings, and in the detailed following description based thereon, set out several possible embodiments of the same.

In these drawings:

Figure 1 is a fragmentary vertical longitudinal section through an automobile body equipped with the upholstery covers, Figure 2 is a detail in perspective of a cover for the back rest of one of the automobile body seats, Figure 3 is an enlarged fragmentary detail in vertical transverse section through a seat back rest showing the manner in which one of the back rest covers is adapted to be detachably secured in position with respect to the back rest, Figure 4 is a similar view showing the means for securing another of the seat back rest covers in proper position with respect to a seat back rest, Figure 5 is a detail in perspective of one of the seat covers and particularly, a cover for a double seat, Figure 6 is a detail in perspective of one of the side wall covers, Figure 7 is a fragmentary detail in vertical transverse section through the door of an automobile body showing the manner in which one of the side wall covers is detachably secured in a taut and smooth position over the upholstered inner surface thereof, Figure 8 is a detail in perspective of a cover for an individual or single seat, Figure 9 is a similar view of another form of cover for a single or individual seat, Figure 10 is an enlarged detail in perspective of the type of seat back rest cover securing means and particularly, that type of cover as illustrated in Figure 3, Figure 11 is a similar view of the type of device for detachably securing a portion of a seat back rest cover in proper position with respect to the seat back rest and particularly, for that type of back rest cover illustrated in Figure 4, and Figure 12 is a detail in perspective of one of the securing brackets employed to detachably connect the upper portions of the side wall upholstery covers to an equipped automobile body side wall.

Having more particular reference to the drawings, in connection with which like characters of reference will designate corresponding parts throughout, it may be stated at the outset, that the improved upholstery covers may be adapted for use in any type or design of automobile body, though, for purposes of illustration in this particular presentation of the invention, I have shown a set of the improved upholstery covers being used in connection with a closed type of automobile body, the body being designated in its entirety by the numeral 1, having a double seat 2 disposed transversely across the rearward end thereof while single or individual seats, as indicated by the numeral 3, are swingably mounted in the forward portion of said body; two doors, one upon either side of the body (there being but one door shown in this particular presentation of the invention) being provided as means of ingress and egress, the said doors being indicated by the numeral 4. Also, it will be noted that the car body is provided with the usual side walls, indicated by the numeral 5, the lower portions of which are upholstered and as will be well understood by persons skilled in this art, are subjected to material wear and contact from the vehicle occupants.

A set of the improved upholstery covers comprises rear seat covers indicated, at this time, by the numeral 6, a back rest cover for the rear seat, designated by the numeral 7, individual front seat covers 8, back rest covers for said individual front seats, indicated by the numeral 9, side wall coverings 10 and door panel upholstery panels 11.

The rear or double seat cover 6, which is shown in the Figure 5, comprises a fabric body formed with marginal or side flap portions 12, the outer extremities of which are provided with a hem 13, through which a draw string 14 is passed, the opposite ends of the draw string extending from the hem adjacent a divided portion 15 of one of the marginal flaps 12, whereby to permit engagement with said ends of the draw string and the tightening and tying of the same in order that the cover 6 will be evenly and positively retained in its enveloping-like arrangement over the seat 2. In this connection, it is, of course, to be understood that the width or depth of the marginal flaps 12 are such that they will fully extend over or cover the adjacent marginal portions of the seat 2 and furthermore, will allow portions of the same to extend under or inwardly with respect to the seat sides whereby with drawing of the draw string 14 and tying of the same, the cover will be caused to be smoothly and tautly retained in its adjusted position over said seat 2.

A back rest cover 7 is provided for the back rest 16 of the rear double seat and consists of an apron-like body of fabric designated by the numeral 18, the shape thereof substantially approximating the exposed side of the back rest 16 and having side and top flaps 19 and 20 formed thereupon, while a plurality of relatively spaced downwardly disposed tapes, or other strips, generally indicated by the numeral 21, are stitched or otherwise joined to the normally lower portion of said back rest cover 18. Also, the normally upper side of the cover 18, that is, the outer side of the top flap 20 is provided with a longitudinally disposed hem along its marginal portion, which hem slidably and removably receives therein one or more bracing and securing rods 22. Portions of the hem formed upon the flap 20 are cut away whereby to permit the arrangement of the looped ends 23 of securing devices 24 therein, these looped portions being adapted to have the rod or rods 22, received in the top flap hem, therethrough. Consequently upon this engagement of the rod or rods 22 with the looped portions 23 of the securing devices 24, it will be understood that a detachable connection as between the securing devices and the back rest cover 18 will be effected.

Any number of the securing devices 24, may be provided along the hem portion of the top flap 20, this primarily depending upon the length of the cover. Each of the securing devices, consists of single pieces of metal bent upon themselves into substantially V-shape, while portions of said metal are looped as heretofore indicated by the numeral 23, in order to provide means for effecting the detachable connection or positioning of the rods 22 therethrough.

In applying the back rest cover 18 to the back rest 16 of the seat 2, the body 18 is arranged over the outer or exposed surface of said back rest 16 in a smooth uniform manner, whereupon the securing devices 24 connected to the cover through the medium of the rods 22, are arranged or engaged between the upper and rearward portion of the back rest 16 and the adjacent portion of the body rear wall, as is shown in the Figure 3. When in this position, it will be seen that while comparatively free upward disengagement of the securing devices from between the back rest 16 and the vehicle body rear wall may be effected, with the application of an outward pull to the looped portions 23 thereof, the V-shaped body portions of the securing devices will be caused to positively bind upon adjacent portions of said back rest and said rear wall, thereby preventing undue disengagement or displacement of the top flap 20 of the cover 18 and effectually retaining said cover 18 in position over the back rest 16. The depending tapes or straps 21 are caused to be arranged between the lower portion of the vehicle body rear wall and the rearward portion of the seat 6, thus securing the same in binding engagement and serving as a means for preventing upward displacement of the cover 18 with respect to the back rest 16. In addition to this, the side flaps 19 of the cover are engaged over the opposite ends or sides of the back rest 16, between the same and the adjacent portions of the vehicle body side walls, thereby effecting the securing of the same against displacement and allowing for the smooth and even positioning of the cover.

The individual seat covers may be stated to comprise envelope or cap-like fabric bodies formed upon three of their sides with interconnected marginal flaps 25, while the remaining or rearward flap is disjoined from the other flaps and extends only from the adjacent portion of the upper side of said cover 8. A marginally disposed hem 26 is formed in the free portions of the interconnected flaps 25 and receives therethrough, a draw string 27 of a length sufficient to permit the same to have encompassing engagement with the particular individual seat 3 to be equipped therewith. The single or disjoined flap 28, provided adjacent the normally rearward portion of the cover 8, upon engagement of said cover over the seat 3, is adapted to be arranged over the adjacent or rearward side of the individual seat, whereupon the free ends of the draw string 27 are passed thereover and the opposite portions of said string are then joined or tied together in a suitable way and sufficiently taut to effect a drawing engagement of the interconnected marginal flaps 25 with the adjacent sides of the seat 3 and to secure the flap 28 thereunder. In this way, it will be understood that the individual seat cover 8 will be smoothly and effectually engaged in its shielding position over the seat 3. In this connection, attention is invited to the fact that the width or depth of the marginal flaps 25 and the disjoined flap 28 are such that they slightly overlap with respect to the adjacent sides of the seat 3. Because of this, said sides of the seat 3 will be effectually covered and consequently, will be effectually shielded from soiling and excessive wearing.

The back rest cover of the individual seat 3, heretofore indicated by the numeral 9, may be stated to comprise an envelope or hood-like fabric body, the same being of a size and shape approximately corresponding to the size and shape of the individual seat back rest and yet, to ensure snug engagement thereover, in the manner as is shown in the Figure 1. The normally lower side of this envelope or hood-like back rest cover 9 is open and one side wall thereof is formed with a reduced flap-like extension 29 while a shorter and reduced flap 30 is formed upon the extremity of the opposite side wall of said cover. Snap fasteners, comprising separable elements 31 and 32, are arranged upon complemental portions of the flap 29 and the rearward side wall of the cover 9 and with the envelope-like engagement of said cover 9 over the individual seat back rest, the flap 29 is passed rearwardly under the lower portion of the seat back rest and the separable fastener elements 31 carried thereupon are engaged with the particularly adjacent companion separable elements 32 secured to the rearward side of the cover 9, as is shown in the Figure 8. In this connection, it, of course, will be understood that the flap 30 is folded inwardly and over the adjacent lower portion of the individual seat back rest and that the longer flap-like extension 29 is engaged over therewith prior to the securing of the separable fastener elements 31 thereupon with the separable fastener elements 32, aforesaid.

As a means for effectually securing back rest covers in proper position over the back rests of double forward seats of automobile bodies, such for instance, as the sedan type of automobile body, where a forward double seat is employed, I provide such a back rest cover, which, incidentally, comprises a body of fabric designated by the numeral 33, along its normally upper marginal portion, with a longitudinally disposed hem 34, portions of said hem being cut away, at equidistant points throughout its length and said hem being adapted to removably receive therethrough a bracing and securing rod 35. Securing devices, comprising metal arms designated by the numeral 36, having certain of the extremities thereof rolled or looped as at 37 and the opposite extremities thereof bifurcated or forked as at 38 are adapted to be arranged adjacent or in the cut out portions of the hem 34 previous to the slidable introduction of the bracing and securing rod 35 therein. With this positioning of the securing devices, the rod 35 is slidably introduced into one end of the hem 34 and is moved therethrough. During such engagement, the rod will pass through the alined loop portions 37 of the securing devices 36 and in this way, it will be understood that a detachable and swingable connection of said securing devices 36 with the back rest cover 33 will be effected.

Screws or other suitable devices, indicated by the numeral 39, are adapted to be engaged in the rearward side of the back rest 40 of an equipped double forward seat, these devices 39 being arranged in proximity to the normal positioning of the securing devices 36 swingably connected through the rod 35 to the cover 33. With placement or arrangement of the cover 33 over the back rest 40, the upper portion of said cover is positioned in the manner as is shown in the Figure 4, that is, with the various securing devices swingably depending therefrom. At this time, the forked portions 38 of the securing devices 36 are engaged with the shank portions of the screws or other securing devices 39 and consequently upon this, the outward pulling away of the cover 33 from the back rest 40, with the resultant disarrangement of the same, will be prevented. Of course, if desired, with engagement of the forked portions 38 of the securing devices 36 with the screws 39, said